(12) United States Patent
Kapur

(10) Patent No.: US 7,231,370 B1
(45) Date of Patent: Jun. 12, 2007

(54) METHOD AND APPARATUS FOR ORGANIZATIONAL SOFTWARE LICENSE SHARING

(75) Inventor: Rajiv Kapur, New Delhi (IN)

(73) Assignee: LSI Corporation, Milpitas, CA (US)

( * ) Notice: Subject to any disclaimer, the term of this patent is extended or adjusted under 35 U.S.C. 154(b) by 2 days.

(21) Appl. No.: 10/904,177

(22) Filed: Oct. 27, 2004

(51) Int. Cl.
 G06Q 99/00  (2006.01)
 H04K 1/00  (2006.01)
 H04L 9/00  (2006.01)

(52) U.S. Cl. .............................. 705/59; 705/50; 705/51
(58) Field of Classification Search .................. 705/59, 705/50, 51
See application file for complete search history.

(56) References Cited

U.S. PATENT DOCUMENTS

| | | | |
|---|---|---|---|
| 5,260,999 A * | 11/1993 | Wyman ........................ | 705/59 |
| 2001/0013024 A1* | 8/2001 | Takahashi et al. ............. | 705/59 |
| 2004/0010440 A1* | 1/2004 | Lenard et al. ................. | 705/10 |
| 2004/0019565 A1* | 1/2004 | Goringe et al. ............... | 705/59 |
| 2006/0085350 A1* | 4/2006 | Samayamantry et al. ..... | 705/59 |

OTHER PUBLICATIONS

Stewart Noyce, Licenses Float Alone, Computer systems New, n 466, 19 1990.*

* cited by examiner

Primary Examiner—Andrew Fischer
Assistant Examiner—Charlie C. L. Agwumezie
(74) Attorney, Agent, or Firm—Suiter Swantz PC LLC (57) ABSTRACT

A method, computer program product, and apparatus for efficiently utilizing software licenses in a large organization having multiple divisions is disclosed. A preferred embodiment of the present invention accomplishes this goal by providing for a pool of organization-wide software licenses. This license pool is subdivided into a number of reserved or dedicated licenses for each particular division and a set of shared licenses to be shared among the various divisions. A given division, when checking out licenses from the organization-wide pool, will first exhaust its reserved licenses before checking out shared licenses. In the event that all shared licenses are being used, but there are reserved licenses that are sitting idle, a division may borrow a reserved license from another division, subject to the lending division's right of preemption in the event that the borrowed license is needed by the division lending the license.

15 Claims, 7 Drawing Sheets

FIGURE 1

$$\begin{aligned}\#Licenses &= (\textstyle\sum_i M_i) + \lambda[\,\textstyle\sum_j (N_j - M_j)] \\ &= 110 + (0.5)(190) \\ &= 205\end{aligned}$$

METHOD AND APPARATUS FOR ORGANIZATIONAL SOFTWARE LICENSE SHARING

TECHNICAL FIELD

The present invention relates generally to software licensing in an enterprise or organizational setting. More specifically, the present invention provides a method and apparatus for sharing software licenses across an organization to reduce costs.

DESCRIPTION OF RELATED ART

Site licensing of software is a commonly employed technique for commercializing software and preventing software piracy, particularly in the context of large organizations. A great number of software products intended for professional or industrial use, including many electronic design automation software tools, utilize a site licensing paradigm. Generally, the organization will purchase a number of software licenses or "seats," which allow a particular number of users to simultaneously use the software (equal to the number of licenses purchased). A "licensing server" keeps track of the number of simultaneous users of the software and grants or denies the use of a license by a particular user in accordance with the number of licenses currently available for use.

Because many large corporations and other organizations are organized into discrete "divisions," budgeting for and procurement of software licenses are typically done on a division-by-division basis, with each division possessing its own pool of software licenses. In this case, a division will typically budget for the worst case scenario—i.e., the division will purchase a number of licenses that is approximately equal to the peak usage of the division over time, in order to insure that the division will have enough licenses to be able to handle its peak workloads.

In the aggregate, however, this scheme can result in a considerable amount of wasted resources, since a large number of licenses will sit idle over a significant amount of time. What is needed, therefore, is way to more efficiently utilize software licenses in a large organization. The present invention provides a solution to these and other problems, and offers other advantages over previous solutions.

SUMMARY OF THE INVENTION

Accordingly, the present invention provides a method, computer program product, and apparatus for efficiently utilizing software licenses in a large organization having multiple divisions. A preferred embodiment of the present invention accomplishes this goal by providing for a pool of organization-wide software licenses. This license pool is subdivided into a number of reserved or dedicated licenses for each particular division and a set of shared licenses to be shared among the various divisions. A given division, when checking out licenses from the organization-wide pool, will first exhaust its reserved licenses before checking out shared licenses. In the event that all shared licenses are being used, but there are reserved licenses that are sitting idle, a division may borrow a reserved license from another division, subject to the lending division's right of preemption in the event that the borrowed license is needed by the division lending the license.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
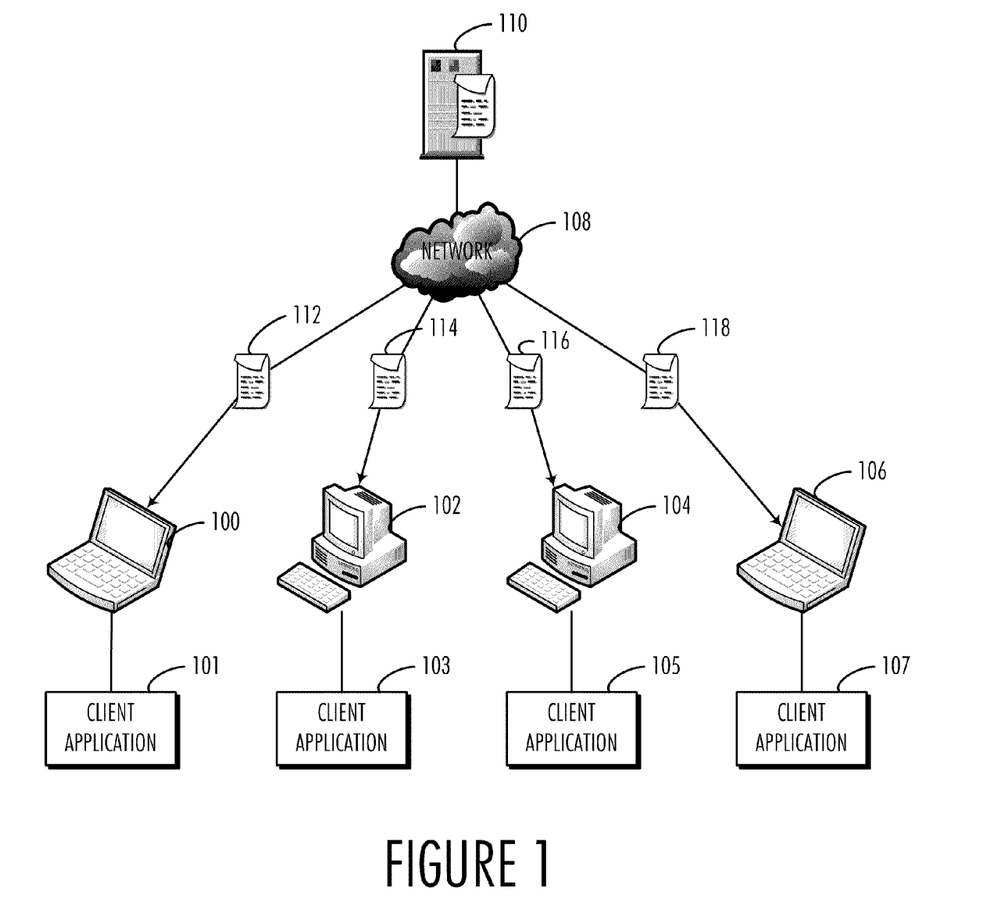
FIG. 1 is a diagram illustrating a conceptual model for organizational software licensing in the context of a preferred embodiment of the present invention.

FIG. 1 is a diagram illustrating a conceptual model for organizational software licensing in the context of a preferred embodiment of the present invention. An organization utilizes a plurality of computers, represented here by computers 100, 102, 104, and 106. Each of computers 100, 102, 104, and 106 has installed on it a copy of a common client application (client application copies 101, 103, 105, and 107). For example, in an electronics engineering firm, computers 100, 102, 104, and 106 may be used by engineers to execute a common set of EDA (Electronics Design Automation) tools.

In order for any of the users of computers 100, 102, 104, and 106 to execute the client application, their respective client application copies 101, 103, 105, and 107 must request a license from a licensing server 110, which is accessible to computers 100, 102, 104, and 106 via a network 108, which may be a local area network (LAN) or a wide-area network (WAN), such as the Internet. Licensing server 110 keeps track of a number of licenses purchased by the organization for the benefit of the organization's users. Client application copies 101, 103, 105, and 107, more specifically, must check out one of these licenses from licensing server 110 (in the sense of checking out a library book) before allowing the user to execute the application, as represented by checked-out licenses 112, 114, 116, and 118 in FIG. 1. Once one of the users of the client application exits the application, the user's checked-out license is then released (surrendered) back to license server 110. This scheme ensures that an organization does not allow more users to use an application than the organization has paid for licenses for.

Figure 2:
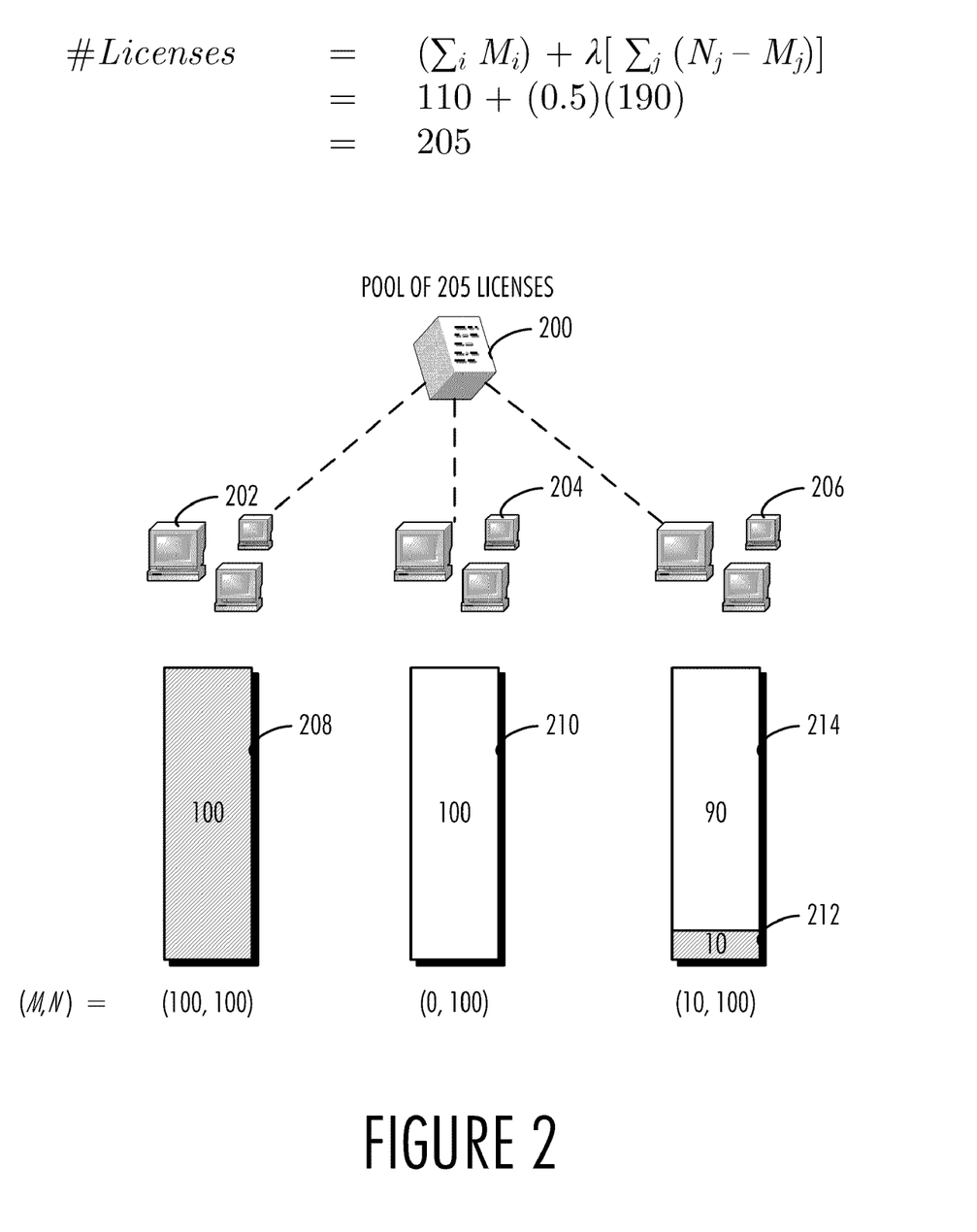
FIG. 2 is a diagram illustrating an allocation scheme for licenses in accordance with a preferred embodiment of the present invention.

FIG. 2 is a diagram illustrating, by way of example, an allocation scheme for licenses in accordance with a preferred embodiment of the present invention. A common pool of licenses 200 is provided for use across various divisions of an organization (e.g., divisions 202, 204, and 206). Divisions 202, 204, and 206 each have their own requirements as to how many licenses they need for their respective divisions. The requirements for each division are utilized to determine the number of licenses in license pool 200 to be purchased for the organization, as well as to allocate those licenses between reserved licenses and shared licenses.

Mathematically, the requirements for each division may be represented by an ordered pair of non-negative integers, (M,N), where M is a minimum number of licenses required for the division and N is an anticipated maximum number of licenses for the division. Conceptually, M may be thought of as the requirements for the division when operating under a normal or minimal workload, while N would represent the requirements for the division when operating under peak workload conditions. Obviously, these numbers will be estimates, and will not represent absolute constraints on the respective divisions. Moreover, these numbers may be arrived at by the various divisions in different ways.

According to a preferred embodiment of the present invention, the minimum and maximum requirements for a given division are utilized to determine a number of reserved and shared licenses to be allocated to a given division. In a typical setting of this preferred embodiment, the distinction between reserved licenses and shared licenses will be significant for internal cost accounting purposes, so as to equitably distribute the overall cost for license pool 200 among the various divisions. For example, a division may be charged periodically (e.g., quarterly) a rate of x dollars for each shared license allocated to the division, while the division may pay a rate of 2x per each reserved license allocated to the division.

Examples of differing requirements for various divisions are represented in FIG. 2 with respect to divisions 202, 204, and 206. As shown in FIG. 2, division 202 has stated its requirements to be (100, 100), meaning that its minimum and maximum anticipated requirements are both equal to 100 licenses. This is essentially equivalent to budgeting for the worst case. In that case, 100 reserved licenses (represented by histogram 208) are allocated to division 202, and division 202, for internal cost accounting purposes, pays 100 times the periodic rate for reserved licenses. Division 202 will enjoy greater availability of software licenses than the other divisions, but at a higher internal cost.

Division 204, on the other hand, has requirements of (0,100), meaning that division 204 makes no minimum requirements, but specifies its maximum requirements as being 100 licenses. In that case, division 204 will be allocated 100 shared licenses (histogram 210) and will pay, for internal cost accounting purposes, 100 times the periodic rate for shared licenses. Division 204 will thus pay a smaller amount for its 100 allocated licenses than division 202, but division 204 does so with the understanding that all 100 of its licenses may not be available at any given time, depending on overall demand for licenses over the organization.

Division 206 has requirements of (10,100), meaning that division 206 requires 10 licenses to be available at all times, but anticipates that under peak-load conditions, division 206 may need up to 100 licenses. Division 206 is therefore allocated 10 reserved licenses (histogram 212) and 90 shared licenses (histogram 214), which is calculated by subtracting the minimum requirement of 10 licenses from the 100-license maximum requirement. Division 206's specification of requirements is a compromise between those of divisions 202 and 204. Division 206 pays for 10 reserved licenses (at a higher cost) to ensure a certain minimum degree of license availability, but pays a lower rate for the 90 additional shared licenses, which saves cost for division 206, as well as for the organization as a whole.

As also illustrated in FIG. 2, the number of licenses in the common license pool, license pool 200, is calculated based on the allocations of reserved and shared licenses may for the various divisions. The total number of licenses held in common is determined by first summing the minimum requirements from all of the divisions (i.e., adding together the "M's" from all of the divisions) to obtain a total number of reserved licenses for the organization. Next, the difference between the maximum and minimum requirements for each division (i.e., "N-M") is determined, and these differences are summed together to obtain a subtotal. This subtotal is then multiplied by a fractional constant $\lambda$, which is typically less than 0.5, to obtain a number of shared licenses to be included in license pool 200. It thus follows that the total number of licenses to be purchased for license pool 200 is obtained by adding the number of reserved licenses for the organization to the number of shared licenses for the organization. Mathematically, this may be expressed as $$\text{\# Licenses} = \left(\sum_i M_i\right) + \lambda \left[\sum_j N_j - M_j\right]$$

In the example provided in FIG. 2, a $\lambda$ value of 0.5 is assumed. There are 110 reserved licenses allocated (100 for division 202 and 10 for division 206), and there are 190 total shared licenses allocated among the divisions (100 for division 204 and 90 for division 206). The total number of licenses for license pool 200 is therefore 205, which is obtained by multiplying the 190 total shared licenses figure by the fractional constant A to obtain 95 and then adding the total number of reserved licenses (110) to that number to obtain 205.

Figure 3:
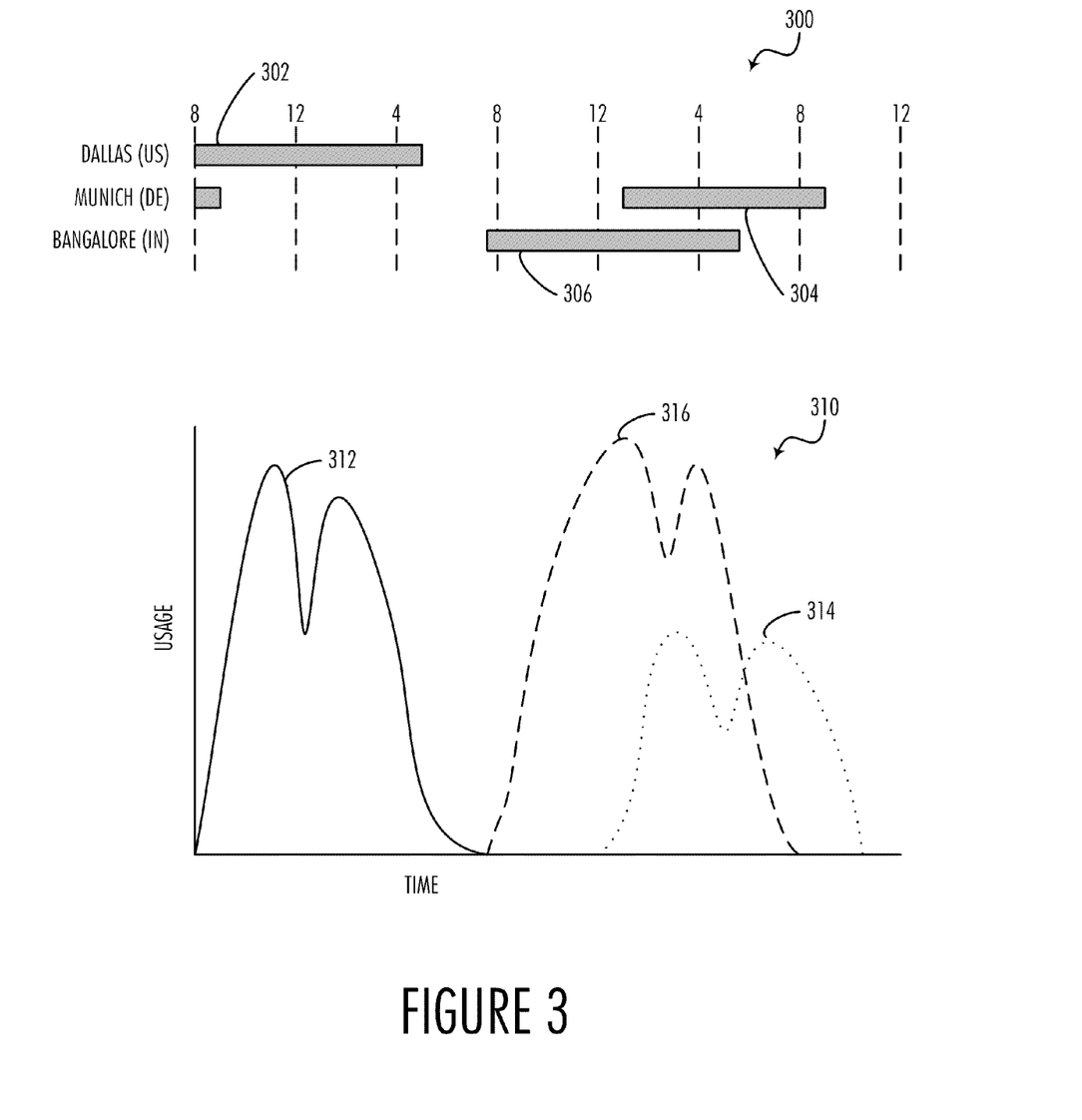
FIG. 3 is a diagram illustrating that the degree of usage of software licenses may vary greatly over time in an organization utilizing a preferred embodiment of the present invention.

The fractional constant $\lambda$ that is applied to determine the size of the set of shared licenses will generally be set based on empirical data regarding the usage of software licenses by various divisions over time. As shown in FIG. 3, the degree of usage of software licenses may vary greatly over time. In FIG. 3, a Gantt chart 300 is juxtaposed with a corresponding line graph 310. Gantt chart 300 and line graph 310 illustrate how license usage among different divisions will vary over time, as well as how license usage within a given division will vary over time in a typical large, international organization. In Gantt chart 300, for example, there are three bars representing the hours of greatest software license usage for three different company divisions located in different parts of the world. As can be seen, bar 302, representing a division located in Dallas, Tex. has a usual period of greatest usage that does not coincide with that of the other two divisions depicted, since the other two divisions are located in a different hemisphere. Bars 304 and 306, representing divisions in Munich, Germany and Bangalore, India, respectively, have a limited degree of overlap in their periods of greatest usage, due to the fact that these two locations are geographically closer to each other longitudinally than to Dallas.

Line graph 310 shows that a finer level of granularity reveals significant changes in software license usage within a single division over time. Each of plots 312, 314, and 316 in line graph 310 represents the license usage of a different division of an organization over a period of a day. Each of the plots is generally hill-shaped, due to the fact that software licenses are most often used during the regular work day. Each of the plots, however, also contains a notch-like feature. This represents most people's lunch break, when many (but not all) users will log out of or shut down whatever licensed software they are running prior to their lunch break. Thus, as can be seen, the actual usage of a given division or group of divisions will vary considerably over time. This variation, and the degree to which the division(s) activities overlap in time, are factors that must be considered in determining a value for the fractional constant $\lambda$.

According to a preferred embodiment of the present invention, enforcing the distinction between reserved and shared licenses is accomplished by way of a series of accounting principles governing the manner in which licenses are obtained and released. According to this preferred embodiment, when a user within a division needs to obtain a license and that division has reserved licenses that are available for use, the user is automatically granted the license, and the license is counted against the number of available reserved licenses for that division.

When the division does not have any available reserved licenses (either because all reserved licenses have been utilized or because the division does not have any reserved licenses), a determination is made as to whether there exist any available shared licenses in the common license pool (i.e., license pool 200 in FIG. 2). If so, then the user is granted the license, and the license is counted against the total number of shared licenses available from the common license pool.

If there are no shared licenses available in the common pool, a determination is made as to whether there are any reserved licenses in the common pool that are not currently being used. This situation may occur when it is night-time in a part of the world in which a division having reserved licenses is located—even though that division may have reserved licenses, the licenses will be sitting idle while the members of that division are presumably asleep. In such a situation, a preferred embodiment of the present invention allows the division seeking a license to borrow a reserved license from another division. The division that "owns" the reserved license, however, is given a right of pre-emption, so that when that owning division requires the use of its reserved license, it may pre-empt use of that license by the borrowing division, so as to reclaim the license for the owning division. When pre-emption is warranted, the user from the borrowing division may be granted a limited amount of time in which to save his or her work-in-progress before use of the license is turned over to the owning division.

FIGS. 4A–4D illustrate, by way of example, how a process of obtaining licenses may play out in a preferred embodiment of the present invention. FIGS. 4A–4D include a series of diagrams, in which each diagram (e.g., diagram 400A) represents the state of an organization at a given time. A first division (division 402A in FIG. 4A) is represented in the diagram as a series of variable/value pairs that denote the current state of that division with respect to licenses available to the division and being used by the division. The variable "MAX_AVAIL" represents a total number of allocated licenses available to the division. "SHR_USED" represents the number of shared licenses currently being used by the division. "RES_AVAIL" and "RES_USED" represent the number of reserved licenses currently available to the division and the number of (non-borrowed) reserved licenses currently used by the division, respectively. "RES_BORWD" and "RES_LOAND" represent the number of reserved licenses currently on loan from another division for use in the present division and the number of reserved licenses from the present division currently on loan to other division(s), respectively.

Similarly, a second division (division 404A in FIG. 4A) is represented with an analogous set of variable/value pairs. Finally, a total number of shared licenses available for the organization is represented by a variable "SHARED_AVAIL" (SHARED_AVAIL variable 406A in FIG. 4A).

Figure 4A:
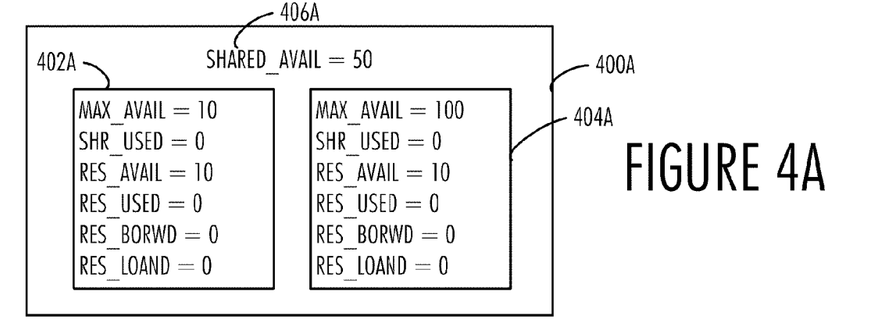
FIGS. 4A–4D are diagrams illustrating a example allocation of software licenses in accordance with a preferred embodiment of the present invention.

Referring now to FIG. 4A, division 402A is a division possessing 10 reserved licenses of its own, and division 402A does not have any shared licenses allocated to it. Division 404A also possesses 10 reserved licenses of its own, but unlike division 402A, division 404A has 90 shared licenses allocated to it for a total of 100 available licenses. Neither division is currently using any licenses in FIG. 4A.

Figure 4B:
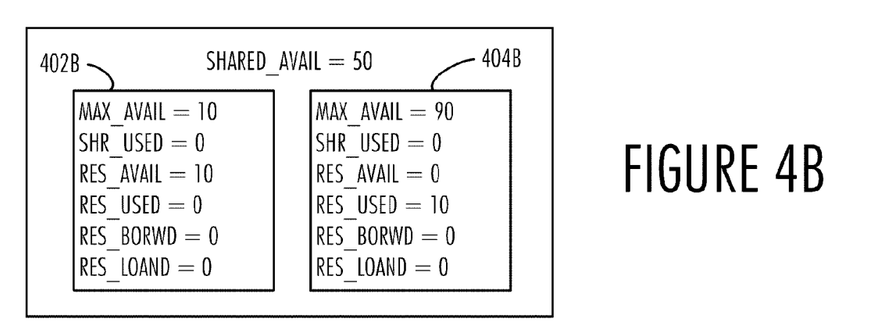

In FIG. 4B, which represents a change of state from FIG. 4A, division 404B now utilizes 10 licenses. Since, in FIG. 4A, this division had 10 reserved licenses available to it, all 10 of the licenses used by division 404B in FIG. 4B are reserved licenses. Thus, RES_USED is set to 10 and MAX_AVAIL is lowered to 90 (indicating 10 allocated licenses being used).

Figure 4C:
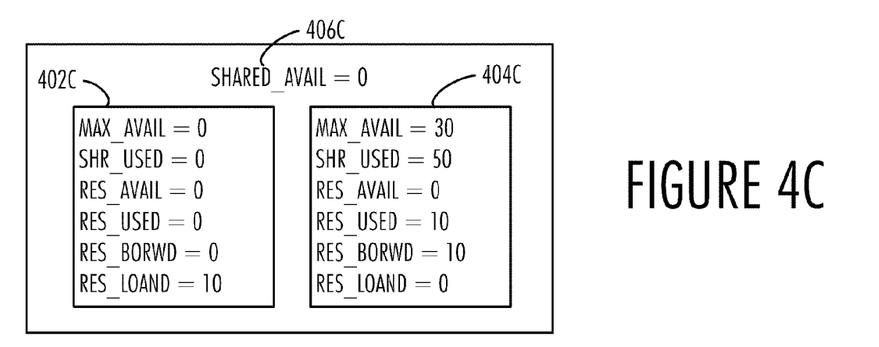

FIG. 4C represents a change of state from FIG. 4B. Now, division 404C requires the use of 60 additional licenses. Since division 404C has no more available reserved licenses (i.e., RES_AVAIL=0), division 404C begins using shared licenses from the common pool. However, since only 50 shared licenses were available in the common pool, only 50 shared licenses are granted to division 404C (i.e., SHR_USED=50).

Division 404C requires 10 additional licenses. Since all shared licenses are being used, however, division 404C can only obtain those 10 licenses if one or more divisions having unused reserved licenses can be located. In this case, since division 402B had 10 unused reserved licenses, division 404C borrows those unused reserved licenses from division 402C. Hence, RES_LOAND=10 for division 402C and RES_BORWD=10 for division 404C. At this point, all licenses in the organization (assuming there are only the two divisions shown) are in use.

It should be noted that at this point, division 404C still has a positive MAX_AVAIL of 30, meaning that division 404C has not utilized more than its total allocated number of reserved and shared licenses. This MAX_AVAIL number may be used to assess how well the current allocation scheme is working. For example, in FIG. 4C, because both MAX_AVAIL and RES-BORWD for division 404C are positive, there is an indication that the selection of $\lambda$ for the organization as a whole may be too low (since there are not enough shared licenses available to meet the stated demands of division 404C). Likewise, MAX_AVAIL may reach a negative number if more licenses are used by the division than were originally allocated to the division—this may be an indication that the division's stated requirements were too low.

Figure 4D:
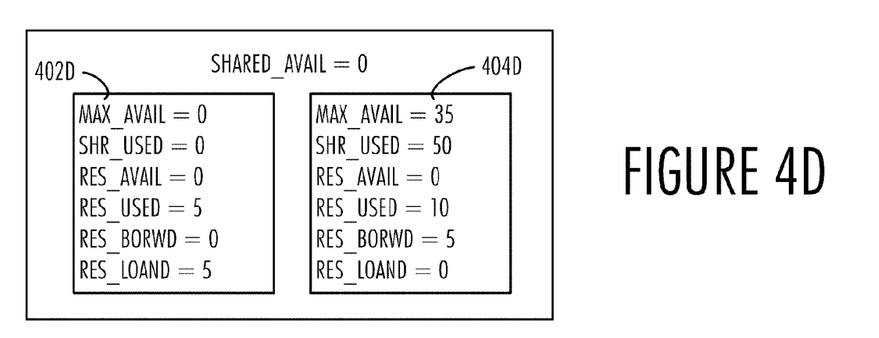

FIG. 4D represents a change of state from FIG. 4C. Now, division 402D requires the use of 5 licenses. However, division 402C had no licenses immediately available to it, since its 10 reserved licenses were all loaned to division 404C. In this case, division 402D must pre-empt division 404D and reclaim 5 of its licenses for itself. Thus, for division 402D, RES_USED is now 5 and RES_LOAND is decreased from 10 to 5, while for division 404D, RES_BORWD is reduced to 5.

Figure 5:
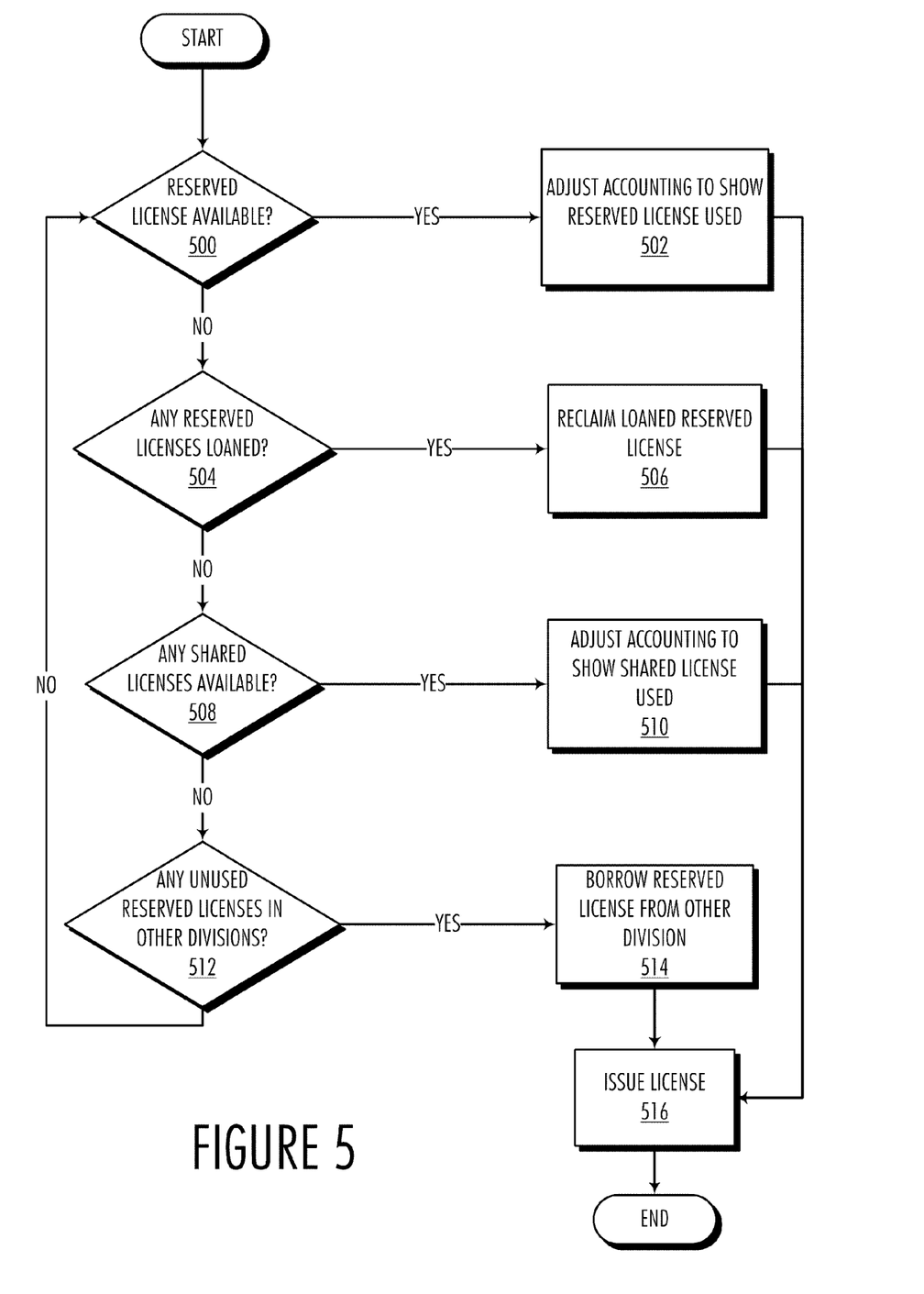
FIG. 5 is a flowchart representation of a process of obtaining a license for a requesting division in accordance with a preferred embodiment of the present invention.
Figure 6:
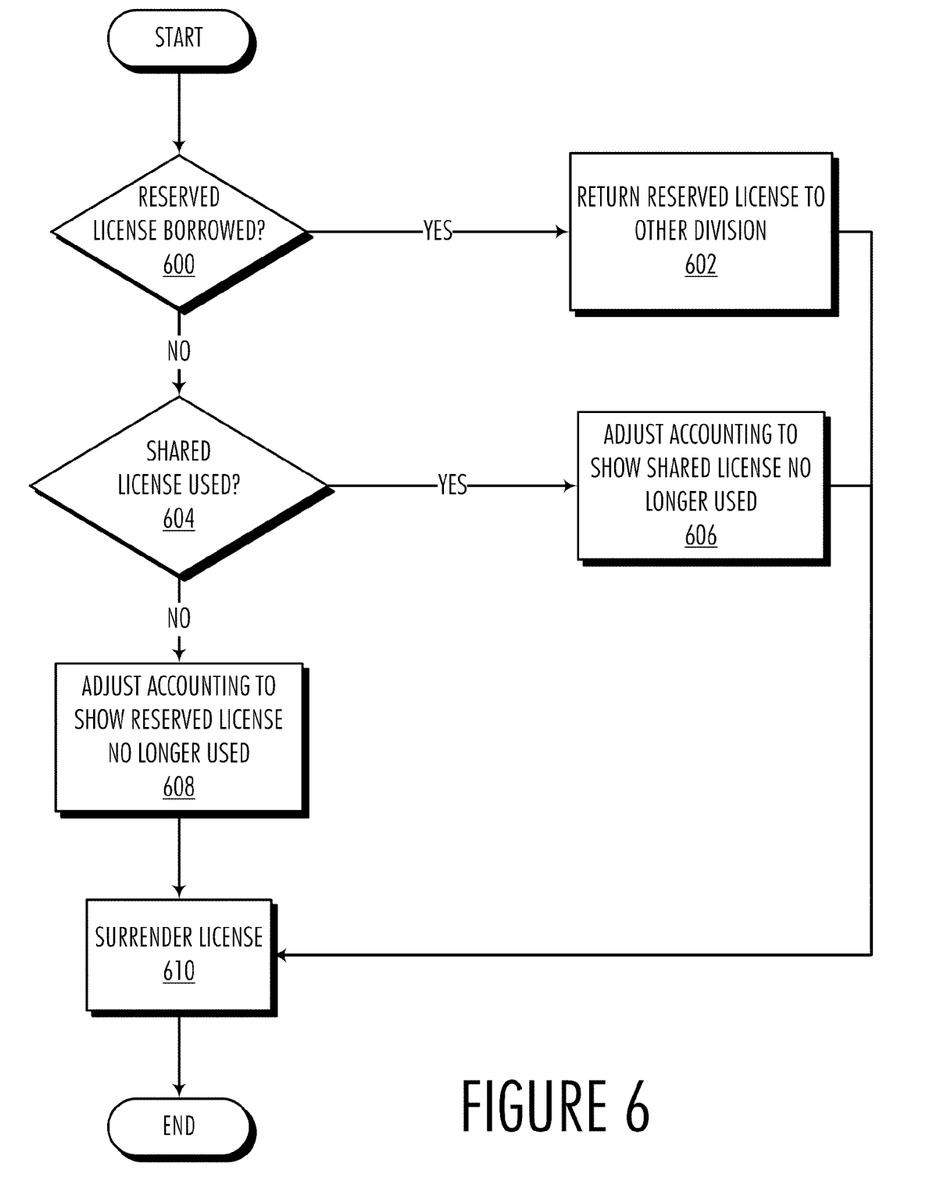
FIG. 6 is a flowchart representation of a process of releasing a license for a division in accordance with a preferred embodiment of the present invention.

FIGS. 5 and 6 are flowcharts explicitly define the processes that are illustrated by way of example in FIGS. 4A–4D. FIG. 5 is a flowchart representation of a process of obtaining a license for a requesting division in accordance with a preferred embodiment of the present invention. If the division has not exhausted its quota of reserved licenses (block 500:Yes), the license accounting for the division is updated to show that a reserved license is now being used (block 502). The license is then issued to the division (block 516).

If not (block 500:No), a determination is then made as to whether any of the requesting division's reserved licenses have been loaned to another division (block 504). If a reserved license has been loaned (block 504:Yes), the license is reclaimed for the requesting division's use (block 506) and issued to the requesting division (block 516).

If no (block 504:No), a determination is then made as to whether the pool of software licenses contains any available shared licenses (block 508). If so (block 508:Yes), then the license accounting for the division is updated to show that a shared license is now being used (block 510) and the license is issued to the requesting division (block 516).

If not (block 508:No), a determination is then made as to whether any other division has a reserved license that it is not currently utilizing (block 512). If so (block 512:Yes), then that reserved license is borrowed from the other division for temporary use of the requesting division (block 514) and the license is issued to the requesting division (block 516). If not (block 512:No), the process loops back to block 500 to await the availability of a software license.

FIG. 6 is a flowchart representation of a process of releasing a license for a division in accordance with a preferred embodiment of the present invention. If the license to be released is a reserved license borrowed from another division (block 600:Yes), the license is returned to the other division for its exclusive use (block 602), and the license is surrendered (block 610).

If not (block 600:No), a determination is made as to whether the license to be released is a shared license (block 604). If so (block 604:Yes), then the license accounting for the division is updated to show that the shared license is no longer being used (block 606), and the license is surrendered (block 610).

If not (block 604:No), then the license being released must be a reserved license. Accordingly, the license accounting for the division is updated to show that the reserved license is no longer being used (block 608), and the license is surrendered (block 610).

Figure 7:
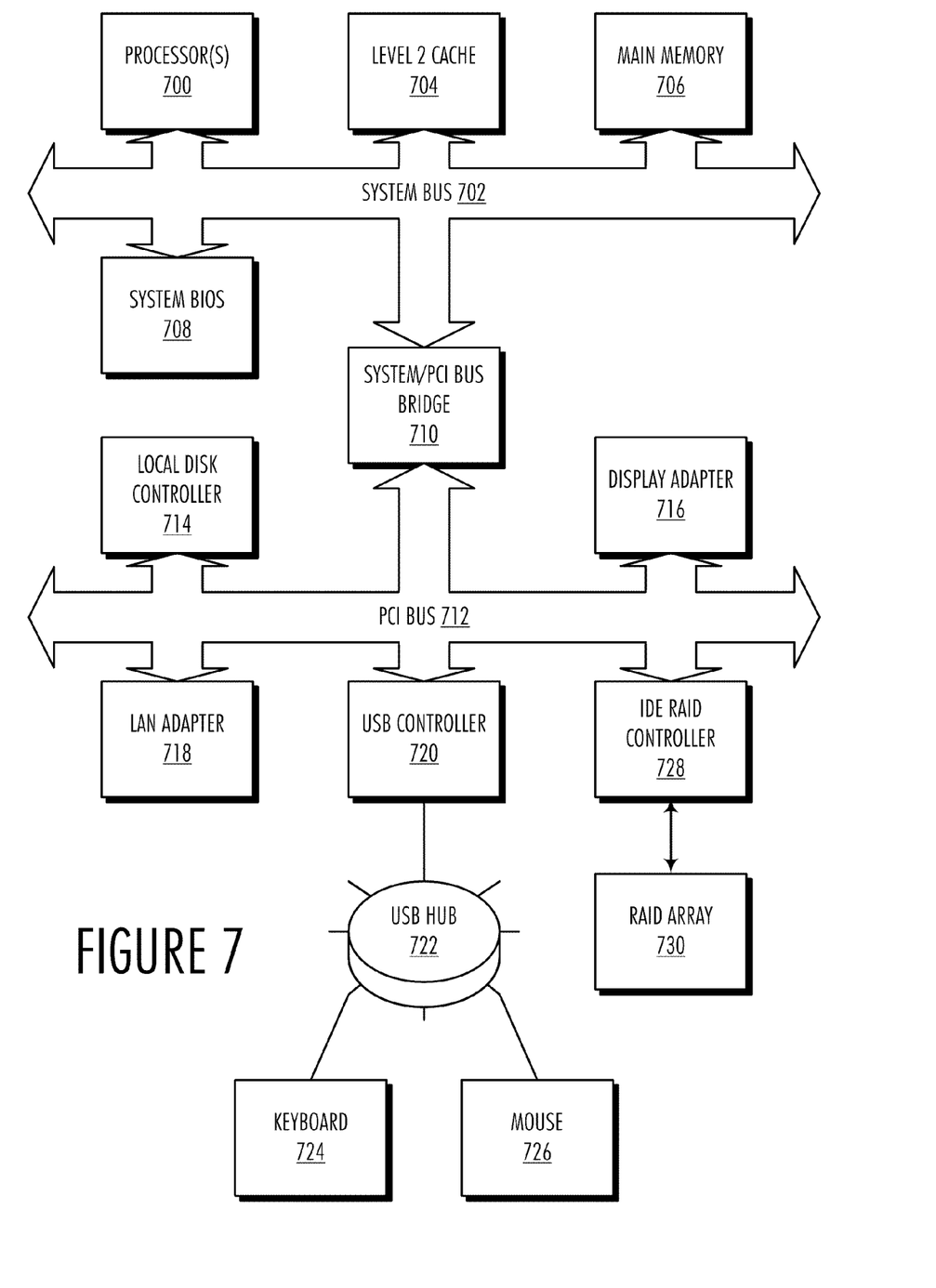
FIG. 7 is a block diagram of a computer system in which a preferred embodiment of the present invention may be implemented.

FIG. 7 is a block diagram of a computer system in which a preferred embodiment of the present invention may be implemented. One or more processors 700 are coupled to a system bus 702, which connects processor(s) 700 to various memory components. Main memory 706, comprising Random Access Memory (RAM), represents the bulk of primary memory storage available to processor(s) 700. A level 2 cache memory 704, which is smaller than main memory 706 but constructed using faster memory components than main memory 706, is a temporary intermediate storage area that allows processor(s) 700 to operate at a higher speed than would otherwise be possible with only main memory 706.

System BIOS 708, a non-volatile memory, contains system firmware for loading an operating system at system startup and for performing various other low-level functions. BIOS is an acronym for "Basic Input/Output System." For performance purposes, it is common for processor(s) 700 to copy the contents of BIOS 708 into main memory 706 for faster access, as RAM generally allows faster access than non-volatile memories; this copying is referred to as "shadowing."

Typically, system bus 702 will follow a proprietary specification associated with processor(s) 700. While this arrangement is acceptable for interfacing processor(s) 700 to memory, because it provides for maximum performance, the proprietary nature of most microprocessor bus signal specifications seriously limits the ability of system buses like bus 702 to interface with off-the-shelf peripheral devices. For that reason, it is customary in computer design to include one or more backplane buses following a standard bus specification, to allow third-party peripheral devices to be connected to the computer system. In FIG. 7, a bus 712 following the Peripheral Component Interconnect (PCI) industry standard is provided for the connection of various peripherals. A system/PC bus bridge 710 connects system bus 702 to PCI bus 712 and translates bus signals between the two buses.

A number of peripheral devices are shown connected to PCI bus 712. One of ordinary skill in the art will recognize that any of a great number of different kinds of devices may be connected to such a bus and that the devices described here as connected to bus 712 are intended to be merely examples. A local disk controller 714 allows data to be read or written to a locally-attached disk device such as a fixed-disk drive or a removable-disk drive. A display adapter 716 provides an interface between PCI bus 712 and a display device, such as a cathode-ray tube (CRT), liquid crystal display (LCD), or plasma display device. Local area network (LAN) adapter 718 connects PCI bus 712 to an Ethernet, 802.11 wireless network, or other form of local area network infrastructure. An IDE (Integrated Drive Electronics) controller 728 to a RAID array (Redundant Array of Inexpensive Disks) 730 is provided. RAID array 730 provides efficient, reliable mass storage of data through an array of individual disk drives working in cooperation with each other to provide rapid throughput and error detection/correction capabilities.

Universal Serial Bus (USB) controller 720 provides an interface between PCI bus 712 and USB hub 722, to which peripheral devices conforming with the USB interface standard may be attached. USB devices are generally "hot-swappable," meaning that they may be safely added or removed from the system while the system is turned on. USB devices are typically used in applications where a removable or external device is desirable, such as in the case of human input devices. For example, in the computer system depicted in FIG. 7, USB keyboard 724 and USB mouse 726 are shown connected to USB hub 722.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A method comprising:
providing a pool of software licenses across an organization, wherein the organization is composed of a plurality of divisions;
determining a number of reserved licenses, the reserved licenses being reserved in the pool of software licenses, wherein each division in the plurality of divisions is associated with at least one corresponding reserved license, the at least one reserved license being reserved for use by that division;
determining a size of a set of shared licenses for meeting workload needs of the organization, wherein determining the size includes:
determining, for each division in the plurality of divisions, a projected minimum number of licenses needed by that division and a projected maximum number of licenses needed by that division;
subtracting the minimum number from the maximum number to obtain a difference for that division;
summing differences over all of the plurality of divisions to obtain a total; and
multiplying the total by a fractional value to obtain the size of the set of shared licenses;
wherein the fractional value is calculated based on empirical data regarding software license usage over time and degree of overlap in division activities;
in response to receiving a license request from a requesting division, determining whether the requesting division has exhausted its corresponding reserved licenses; and
in response to a determination that the requesting division has exhausted its corresponding reserved licenses and based on the size of the set of shared licenses, granting the requesting division a license an available license from the set of shared licenses, wherein the set of shared licenses form a distinct subset of the pool of software licenses with respect to the reserved licenses within the pool of software licenses.

2. The method of claim 1, further comprising:
in response to a determination that the requesting division has not exhausted its corresponding reserved licenses, granting the requesting division a license from the requesting division's corresponding reserved licenses.

3. The method of claim 1, further comprising:
computing a number of licenses needed for the pool of software licenses by adding the number of reserved licenses being reserved in the pool of software licenses to the size for the set of shared licenses.

4. The method of claim 1, further comprising:
determining whether any of the set of shared licenses is free for use;
in response to determinations that none of the set of shared licenses is free for use and that the requesting division has exhausted its corresponding reserved licenses, determining whether there exists a second division has a corresponding reserved license that is not being used by the second division; and
in response to a determination that there exists a second division has a corresponding reserved license that is not being used by the second division, granting the requesting division use of the corresponding reserved license.

5. The method of claim 4, further comprising:
in response to the second division requiring use of a software license, restoring the corresponding reserved license from the requesting division's use to the second division's use.

6. A computer program product in a computer readable medium, comprising functional descriptive material that, when executed by a computer, causes the computer to perform actions that include:
providing a pool of software licenses across an organization, wherein the organization is composed of a plurality of divisions;
determining a number of reserved licenses, the reserved licenses being reserved in the pool of software licenses, wherein each division in the plurality of divisions is associated with at least one corresponding reserved license, the at least one reserved license being reserved for use by that division;
determining a size of a set of shared licenses for meeting workload needs of the organization, wherein determining the size includes:
determining, for each division in the plurality of divisions, a projected minimum number of licenses needed by that division and a projected maximum number of licenses needed by that division;
subtracting the minimum number from the maximum number to obtain a difference for that division;
summing differences over all of the plurality of divisions to obtain a total; and
multiplying the total by a fractional value to obtain the size of the set of shared licenses;

wherein the fractional value is calculated based on empirical data regarding software license usage over time and degree of overlap in division activities;

in response to receiving a license request from a requesting division, determining whether the requesting division has exhausted its corresponding reserved licenses; and in response to a determination that the requesting division has exhausted its corresponding reserved licenses and based on the size of the set of shared licenses, granting the requesting division a license an available license from the set of shared licenses, wherein the set of shared licenses form a distinct subset of the pool of software licenses with respect to the reserved licenses within the pool of software licenses.

7. The computer program product of claim 6, comprising additional functional descriptive material that, when executed by the computer, causes the computer to perform additional actions of:

in response to a determination that the requesting division has not exhausted its corresponding reserved licenses, granting the requesting division a license from the requesting division's corresponding reserved licenses.

8. The computer program product of claim 6, comprising additional functional descriptive material that, when executed by the computer, causes the computer to perform additional actions of:

computing a number of licenses needed for the pool of software licenses by adding the number of reserved licenses in the pool of software licenses to the size for the set of shared licenses.

9. The computer program product of claim 6, comprising additional functional descriptive material that, when executed by the computer, causes the computer to perform additional actions of:

determining whether any of the set of shared licenses is free for use;

in response to determinations that none of the set of shared licenses is free for use and that the requesting division has exhausted its corresponding reserved licenses, determining whether there exists a second division has a corresponding reserved license that is not being used by the second division; and in response to a determination that there exists a second division has a corresponding reserved license that is not being used by the second division, granting the requesting division use of the corresponding reserved license.

10. The computer program product of claim 9, comprising additional functional descriptive material that, when executed by the computer, causes the computer to perform additional actions of:

in response to the second division requiring use of a software license, restoring the corresponding reserved license from the requesting division's use to the second division's use.

11. A data processing system comprising:

means for providing a pool of software licenses across an organization, wherein the organization is composed of a plurality of divisions;

means for determining a number of reserved licenses, the reserved licenses being reserved in the pool of software licenses, wherein each division in the plurality of divisions is associated with at least one corresponding reserved license, the at least one reserved license being reserved for use by that division;

means for determining a size for the of a set of shared licenses for meeting workload needs of the organization, wherein determining the size includes:

determining, for each division in the plurality of divisions, a projected minimum number of licenses needed by that division and a projected maximum number of licenses needed by that division;

subtracting the minimum number from the maximum number to obtain a difference for that division;

summing differences over all of the plurality of divisions to obtain a total; and multiplying the total by a fractional value to obtain the size of the set of shared licenses;

wherein the fractional value is calculated based on empirical data regarding software license usage over time and degree of overlap in division activities;

means responsive to receiving a license request from a requesting division, determining whether the requesting division has exhausted its corresponding reserved licenses; and means for, responsive to a determination that the requesting division has exhausted its corresponding reserved licenses and based on the size of the set of shared licenses, granting the requesting division a license an available license from the set of shared licenses, wherein the set of shared licenses form a distinct subset of the pool of software licenses with respect to the reserved licenses within the pool of software licenses.

12. The data processing system of claim 11, further comprising:

means, responsive to a determination that the requesting division has not exhausted its corresponding reserved licenses, for granting the requesting division a license from the requesting division's corresponding reserved licenses.

13. The data processing system of claim 11, further comprising:

means for computing a number of licenses needed for the pool of software licenses by adding the number of reserved licenses in the pool of software licenses to the size for the set of shared licenses.

14. The data processing system of claim 11, further comprising:

means for determining whether any of the set of shared licenses is free for use;

means, responsive to determinations that none of the set of shared licenses is free for use and that the requesting division has exhausted its corresponding reserved licenses, determining whether there exists a second division has a corresponding reserved license that is not being used by the second division; and means, responsive to a determination that there exists a second division has a corresponding reserved license that is not being used by the second division, granting the requesting division use of the corresponding reserved license.

15. The data processing system of claim 14, further comprising:

means, responsive to the second division requiring use of a software license, for restoring the corresponding reserved license from the requesting division's use to the second division's use.

* * * * *